United States Patent [19]

McNab et al.

[11] Patent Number: 4,937,855
[45] Date of Patent: Jun. 26, 1990

[54] BUILDING SECURITY SYSTEM

[75] Inventors: Wayne McNab, Ladner; Jim Siu, Vancouver, both of Canada

[73] Assignee: Viscount Industries Limited, Vancouver, Canada

[21] Appl. No.: 154,772

[22] Filed: Feb. 9, 1988

[51] Int. Cl.$^5$ .................. H04M 11/04; H04Q 3/58
[52] U.S. Cl. ................................. 379/103; 379/51
[58] Field of Search .......... 379/103, 355, 95, 102, 379/104, 105, 40, 51

[56] References Cited

U.S. PATENT DOCUMENTS

| | | | |
|---|---|---|---|
| 3,484,561 | 12/1969 | Matthews | 379/103 |
| 3,917,911 | 11/1975 | Lesher | 379/103 |
| 3,947,641 | 3/1976 | Trell | 379/103 |
| 3,990,075 | 11/1976 | Schmitz et al. | 374/40 X |
| 4,644,104 | 2/1987 | Middlemiss | 379/103 |
| 4,748,654 | 5/1988 | Gray | 379/104 |
| 4,764,953 | 8/1988 | Chern et al. | 379/355 |
| 4,766,548 | 8/1988 | Cedrone et al. | 379/102 |

FOREIGN PATENT DOCUMENTS

| | | | |
|---|---|---|---|
| 806751 | 2/1969 | Canada | 379/103 |
| 827244 | 11/1969 | Canada | 379/103 |
| 918830 | 1/1973 | Canada | 379/103 |
| 8501169 | 3/1985 | World Int. Prop. O. | |
| 8700378 | 1/1987 | World Int. Prop. O. | |

OTHER PUBLICATIONS

GTE Automatic Electric Journal, "New Electronic Enterphone System", Jan. 1979, pp. 6-13.
Trell V. Marlee Electronics Corp., 5USPQ2d, pp. 1501-1510 10/19/1987.
GTE Enterphone Brochure entitled "DOOR-Entry, Etc."
GTE Brochure entitled Enterphone, An Electronic Apartment control.
Viscount Brochure entitled Enterphone.

*Primary Examiner*—George Keith E.
*Attorney, Agent, or Firm*—Seed and Berry

[57] ABSTRACT

A building security system for coupling to a building telephone line which includes a building subscriber telephone line connected to a subscriber telephone set on one end and to a central office line at the other end. The central office line leads to a central office exchange. The building security system controls communication between a central office exchange caller, a subscriber and a visitor at an intercom station in order to allow subscriber control of visitor entry and for allowing entry without subscriber control to authorized personnel. The system includes a micro-controller, a non-volatile memory coupled to micro-controller which is programmable for storing system parameters including security entry codes and a building door latch of an entrance door which is coupled to the micro-controller. The latch is operative in response to a control signal from the micro-controller to unlock the associated entrance door. A line relay is coupled to micro-controller for breaking direct connection of the central offices subscriber line and inserting in series with each of the latter a security system line which operates in response to a control signal from the micro-controller. A visitor intercom station is coupled to the micro-controller and is connectable to the subscriber telephone set through the system line in response to a control signal from the micro controller. The intercom station has a key pad for manually entering data and response to which the micro-controller accesses the subscriber telephone set or operates the door latch if the data entered corresponds to a security entry code number stored in the non-volatile memory.

12 Claims, 18 Drawing Sheets

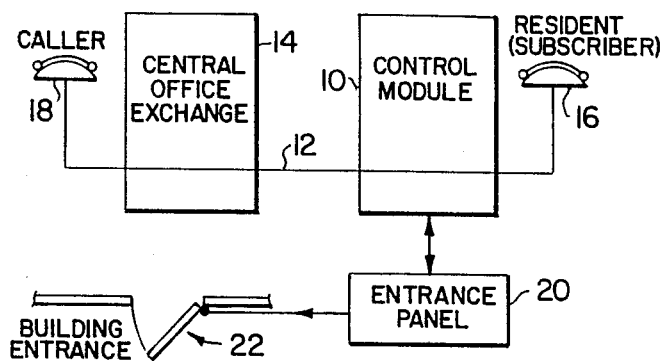
FIG. I PRIOR ART
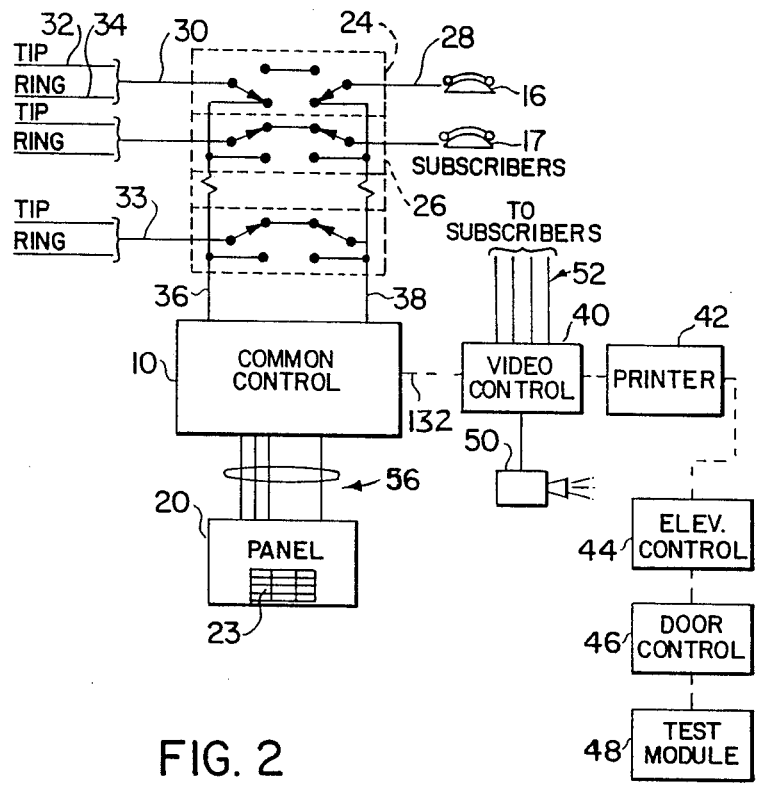
FIG. 2

BUILDING SECURITY SYSTEM

BACKGROUND OF THE INVENTION

The present invention relates to a building security system for controlling building entry doors, establishing and controlling resident-visitor communication, interfacing visitor communication with ordinary telephone communication and establishing various other types of communications, monitoring and control functions.

A common type of apartment intercom and door opening system known as an auto-dialer system utilizes only an intercom panel with a keypad at the building entrance door. The panel is coupled to a dedicated telephone line leading to a central office exchange. Communication is effected through the central office exchange between a visitor and a subscriber. Although relatively simple to install, the auto-dialer system has a number of disadvantages. First, it requires an extra line to the central office, the cost for which can be significant. Second, when a subscriber line is busy a visitor at the building entrance door must simply wait unless the subscriber happens to have a call waiting system. Similarly, when on a call to the intercom panel, an incoming call gets a busy signal unless the subscriber happens to have a call waiting system. Finally, the auto-dialer system is not very secure as an unauthorized entry can be effected simply by using a remote dialer to dial the predetermined digit which opens the door.

An early type of apartment-intercom and door release system which overcomes most of the previous problems is described in Canadian Pat. No. 918,830 issued Jan. 9, 1973 which is a re-issue of Canadian Pat. No. 806,751 issued Feb. 18, 1969 to John T. Matthews and also U.S. Pat. No. 3,484,561 issued to the same invention for the same subject matter as the former Canadian Patent. The Matthews system utilizes line switching relays to switch tip and ring lines running from a central office exchange to a subscriber apartment. Operation of a line relay inserts a section of system tip and ring lines intermediate the central office lines and the subscriber lines. Common switching equipment interfaces visitor calls at an intercom panel with subscriber apartment for each subscriber apartment in a building. More particularly, the common switching equipment thus introduced in series with the tip and ring lines, allows the visitor to call the subscriber and the subscriber either to converse with the visitor or, if the subscriber is busy with an exchange caller to "beep" the subscriber and allow him to place the exchange called on hold and then transfer to the visitor. By dialing preselected numbers the subscriber could either admit or deny access through the door and then return to his exchange call by simply operating the telephone dial. The common switching equipment performs ringing, call-waiting, and ring-back signals. Moreover, no wiring other than the apartment telephone lines and the lines to the entrance door are necessary.

Subsequent to Matthews there were advances made in the implementation of such systems including the use of microprocessors to replace analog methods, the use of touch tone keyboards at the door panel and touch tone calling devices. However, the Matthews type system has really been limited to functioning only as an apartment intercom and door release system.

Building security not only involves authorized door entry but also includes such things as a provision for rapid access to emergency numbers, a means for allowing entry on a individual basis for selected individuals, a means for monitoring and recording entries and a simple means for allowing authorized persons to reprogram the panel in the event changes take place.

Accordingly, it is an object of the invention to provide an improved building security system.

It is a further object of the invention to provide a building security system which permits entry to selective individuals and provides a means for allowing authorized persons to reprogram he system, to deny access to any of these individuals or to permit access to yet other selected individuals.

It is yet another object of the invention to provide a capability for rapidly dialing a predetermined number of emergency numbers on a dedicated line to a central office exchange.

It is yet another object of the invention to provide a means for remotely programming the system.

Finally, it is an object of the invention to provide an expansion port for additional control features such as a video controller, an elevator controller, an additional door controller and a printer for recording entries into the building.

SUMMARY OF THE INVENTION

According to the invention there is provided a building security system for coupling to a building telephone line which includes a building subscriber telephone line connected to a subscriber telephone set at one end and to a central office line at the other end. The central office line leads to a central office exchange. The building security system controls communication between a central office exchange caller, a subscriber and a visitor at an intercom station for allowing subscriber control of visitor entry and for allowing entry without subscriber control to authorized personnel. The system includes a micro-controller, non-volatile memory means coupled to the micro-controller which is programmable for storing system parameters including security entry codes and a building door latch coupled to the micro-controller means which is operative in response to a control signal therefrom to unlock an associated entrance door. A line relay is coupled to the micro-controller for breaking direct connection of the central office and subscriber line and inserting in series with each of the latter a security system line in response to a control signal from the micro-controller. A visitor intercom station is coupled to the micro-controller and is connectable to the subscriber telephone set through the system line in response to a control signal from the micro-controller. The visitor intercom station has keypad means for manually entering data in response to which the micro-controller accesses the subscriber telephone set or operates the door latch if the data entered corresponds to a security code number stored in the non-volatile memory means.

Preferably the system includes a two-way driver circuit coupled between the micro-controller and the special feature port consisting of circuit input and output terminals for transmitting data to and from the micro-controller such that a second controller may be coupled to and be controlled by the micro-controller and a test module can communicate with the micro-controller to run system diagnostics, and enter system operating parameters.

Advantageously the system includes a multi-frequency transceiver coupled to the micro-controller wherein the non-volatile memory means is programmable to store a plurality of telephone numbers. In response to entry of a selected auto-dial code the micro-controller obtains from the non-volatile memory means a corresponding stored telephone number and transmits it to the multi-frequency transceiver. The transceiver generates tones corresponding to the stored telephone number and transmits them to the central office exchange through the security system line.

The system may further include a call detecting means coupled to a dedicated central office line. In response to an incoming call on the dedicated central office the detecting means detect the call and switches the security lines to the dedicated central office line. The micro-controller detects the call, places a load on the dedicated line simulating an "off hook" telephone set and sends out tones to the central office line indicating a programming ready status. The system then is able to receive and store programming data transmitted from a central office caller.

The building security system may include a controller designed not only to operate as an apartment intercom and door opening system but also to provide means for rapid emergency communications and building access to selected personnel in response to the entry at an intercom panel of corresponding security codes which match codes stored in the system. The micro-controller is also adapted to provide remote programming and an expansion port to permit the addition of video controllers, printers and elevator controls. Thus, the foregoing capabilities produce a comprehensive building security system rather than simply an apartment intercom and door opening system. The capacity to form such a comprehensive set of functions is in part attributable to utilization of an array of electrically erasable non-volatile memory cells coupled to the micro-controller. The program required to make the micro-controller perform the comprehensive set of functions is stored in another bank of non-volatile memory cells.

BRIEF DESCRIPTION OF THE DRAWINGS

The invention will be more fully understood from the following detailed description of a preferred embodiment thereof, together with the drawings in which:

FIG. 1 is a diagram representation of a conventional apartment intercom and door opening system;

FIG. 2 is a representation of the building security system according to a preferred embodiment of the present invention;

DETAILED DESCRIPTION OF A PREFERRED EMBODIMENT

Figure 3:
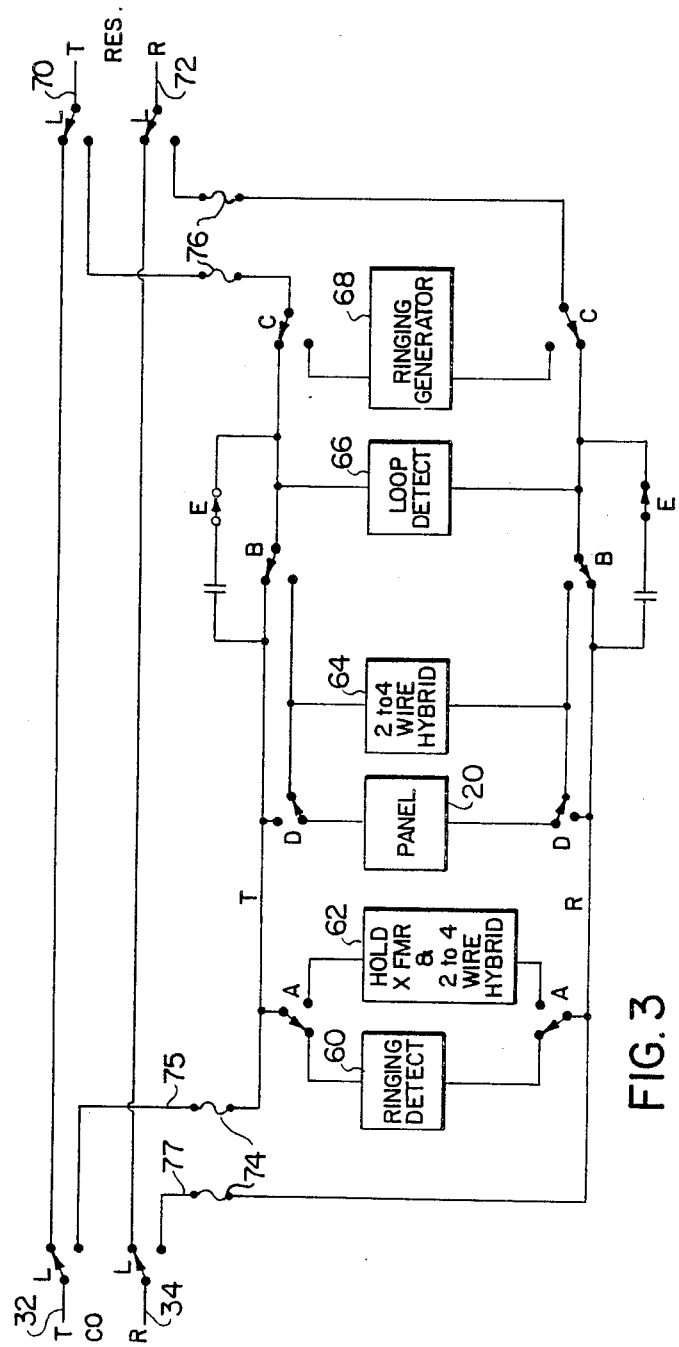
FIG. 3 is a block diagram representation showing various relays and associated blocks controlled by each of these relays.

Referring to FIG. 1 there is shown a single telephone line 12 which interconnects a telephone set 16 of an apartment resident or subscriber with a telephone 18 of a remote caller. The call passes through a central office exchange 14 before entering the apartment building in which there is installed a common controller 10. The control module 10 interfaces with an entrance panel 20 normally located near a building entrance door 22 at the exterior thereof. With visitor-resident communication established between the subscriber telephone set 16 and the entrance panel 20, the subscriber may unlock door 22 and allow a visitor entry into the building. In the event a visitor seeks access to a subscriber during a time when the subscriber is already busy talking with a remote caller, conventional systems provide for the transmission of intrusion tones to the subscriber to advise him of the presence of a visitor. The subscriber ordinarily can then dial a predetermined number and place the central office caller on hold while talking with the visitor. By dialing a second number the visitor can either be given access into the building by unlocking door 22 or access can be denied with the subscriber returning to his central office caller. If the caller seeks access at a time when the resident is communicating with a visitor at entrance panel 20, conventional systems also provide for supplying intrusion tones to the subscriber to let him know of the incoming call. Again simply by dialing suitable numbers the door can be opened, and the telephone revert to the caller or access can be denied to the visitor with the resident returning to the caller. Thus, conventional systems are very limited in providing only for interfacing visitor communication with normal telephone communication and control of door entry.

A system having a much expanded set of functions is shown in FIG. 2 in which sets of tip 32 and ring 34 lines are represented as a single line 30 coupled to one wiper of a line relay 24 with the other wiper being connected by means of a similar telephone line 28 actually consisting of a tip and ring line (not shown) to a subscriber telephone set 16. A second line relay 26 interconnects another central office line with another subscriber telephone set 17. This system is repeated for each apartment in a building. The last central office line 33 is reserved as a reserved central office line. The line relays are all coupled to a common controller 10. The common controller 10, in turn, is coupled by means of a plurality of lines 56 to an entrance panel 20 located at the exterior of the building usually near the entrance door 22. Panel 20 has a standard 3×4 telephone key pad 23 which beats 3 column frequencies with 4 row frequencies to produce 12 different signals each characteristic of a given key. A special features port 132 is provided to the common controller 10 in order to permit the coupling of equipment such as a video-controller 40, a printer 42 for keeping a hard copy record of visitor entries, an elevator controller 44 for controlling the floor to which an elevator may go when operative and a test module 48 to perform a number of different functions including remote programming, the test module panel simulation and common control electronics diagnostics as shown schematically in FIG. 2. A camera 50 is coupled to the video controller 40 and is located at the panel 20 to provide a video display of a visitor to a selected subscriber T.V. set coupled by a corresponding one of a set of video cables 52.

Referring to FIG. 3 there is shown a section of system telephone tip and ring lines 75 and 77, respectively, together with line relay contacts which interconnect central office tip and ring lines 32 and 34, respectively, to resident or subscriber tip and ring lines 70 and 72, respectively. The section of system telephone lines 75 and 77 are each protected by fuses 74 and 76 in combination with associated over voltage protection (not shown). As shown relay A switches between a ring detect circuit 60 and a hold transformer and 2 to 4 wire hybrid circuit 62. On detecting an in-coming call from a central office caller along lines 75 and 77, the ring detect circuit 60 provides a signal which results in relay A being switched to hold transformer T2 and 2 to 4 wire hybrid driver 62. The 2 to 4 wire hybrid driver circuit 62 permits the transmission or reception of signals by driver 62 along ring line 75 and 77. Relay B couples the resident or subscriber telephone set to either the central office lines 32 and 34 in the position shown or to 2 to 4 wire hybrid circuit 64. Relay D switches the entrance panel 20 between 2 to 4 wire hybrid circuit 64 and system lines 75 and 77. Relay C switches tip and ring subscriber lines 70 and 72 from a loop detect circuit 66 and tip and ring line 75 and 77, respectively, to a ringing generator 68. The operation of the circuits shown in FIG. 3 will be discussed in more detail when referring to FIG. 4.

Figure 4A:
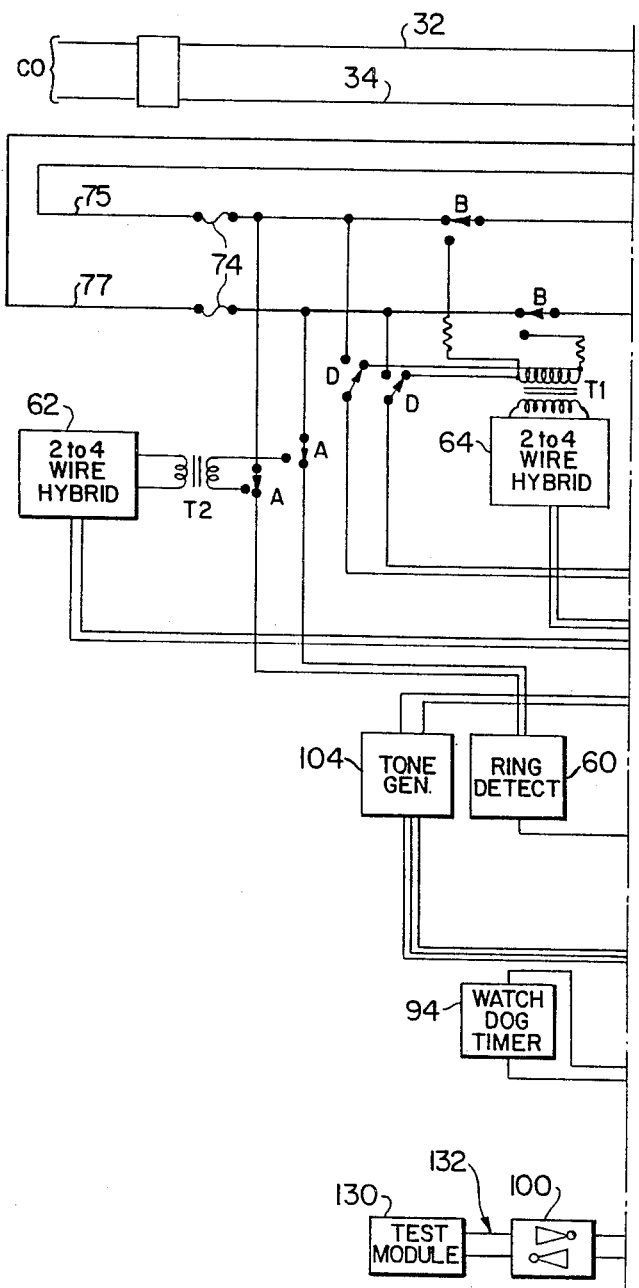
FIGS. 4A, 4B, and 4C, in combination as shown in FIG. 4D, form a detailed diagram of the buildings security system according to a preferred embodiment of the present invention.
Figure 4B:
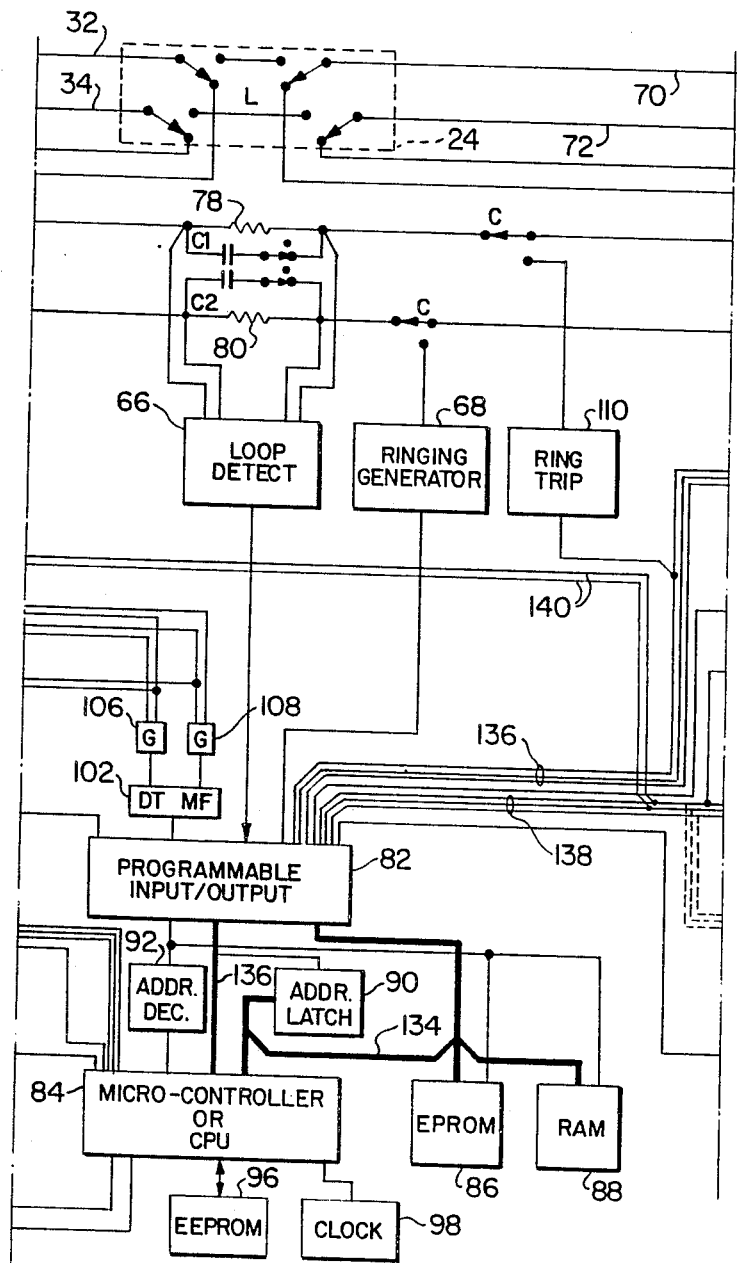
Figures 4C, 4D:
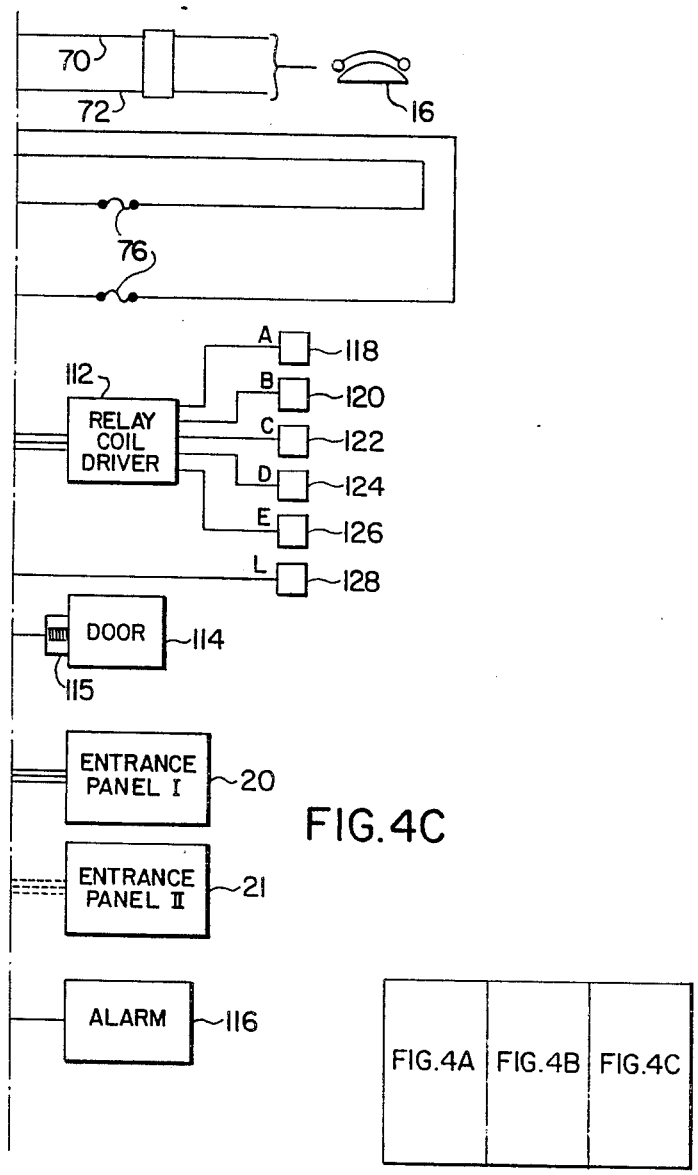

Referring to FIG. 4, there is shown only a single line relay 24 corresponding to a single subscriber set of subscriber tip and ring lines 70 and 72 coupled to subscriber telephone set 16. In fact there are generally a plurality of subscriber telephone sets, telephone lines, line relays and associated central office lines. Ordinarily the line relay L provides direct communication between the central office lines 32 and 34 and the subscriber tip and ring lines 70 and 72.

System telephone line sections 75 and 77 are in series with current sensing resistors 78 and 80, respectively. Resistors 78 and 80 used to detect loop DC current to determine whether or not the resident is "on hook" (idle) or "off hook" (busy). Capacitors C1 and C2 in series with relay contacts E allow a.c. speech signals to bypass the resistors 78 and 80. Lines across resistors 78 and 80 go to loop detect circuit 66 whose output is directed to an input terminal of a programmable input/output circuit 82.

Programmable input/output circuit 82 is coupled to micro-controller or micro processor 84 by means of a set of control lines 136 and a data bus line 134. The data bus line 134 also connects to an address latch circuit, an array of electrically programmable read only memory cells (EPROM) 86 and a random access memory cell array (RAM) or working memory 88. EPROM array 86 is used to store the operating program. The address latch 90 is used to store the first 8 address bits transmitted by the micro-controller or micro processor 84 so that the associated address line can be multiplexed with data sent at a subsequent time from the same eight micro-controller output bits. Thus, the operation consists of transmission of address bits 8 to 13 directly from the micro-controller to the EPROM array 86 and latching the address bits 0 to 7 by the address latch 90. Next, data is sent from the micro-controller 84 at the same outputs as were previously used to send the address bits 0 to 7. At approximately the same time as the latter data is transmitted the first 8 bits of the address stored in the address latch are also transmitted to the EPROM memory array 86. The same outputs as go to EPROM memory array 86 also go to RAM memory bank 88.

Address decoder 92 is coupled to the micro-controller or CPU 84 at an input thereof and at output enable inputs of a programmable input/output circuit 82, EPROM memory array 86 and RAM memory bank 88. A watchdog timer circuit 94 contains a timer for resetting the micro-controller 84 and the programmable input/output circuit 82. A dual tone multi-frequency transceiver 102 (DTMF) is coupled to the programmable input/output circuit 82 and in response to the receipt of data from the latter, transmits output tones out of analog gate 108 and receives and interprets tones transmitted through analog gate 106. Lines from analog gates 106 and 108 go to a 2 to 4 wire hybrid circuit 64 which provides two way transmission through a transformer T1 and contacts of relay B. The other two lines from analog gates 106 and 108 go to a second 2 to 4 wire hybrid circuit 62 as well as to a tone generator 104. The 2 to 4 wire hybrid circuit 62 provides two way transmission of signals through the two contacts of relay A.

A tone generator circuit 104 in response to input received from the micro-controller 84 transmits tones to each of the 2 to 4 wire hybrid circuits 62 and 64. A ring detect circuit 60 provides an output pulse to the programmable input/output circuit 82 in response to a ringing signal detected on lines 75 and 77. An entrance panel 20 couples by means of line 138 to the programmable input/output circuit 82. A second entrance panel 21 is insertable in parallel with the entrance panel 20 but not for concurrent operation therewith. Relay coils for relays A, B, C, D, and E and noted by reference numbers 118 through 126, respectively, are each driven by a relay coil driver 112 whose input is coupled to the programmable input/output circuit 82 by lines 136. Although only 1 relay coil for relay L is shown, in fact there are as many such coils and associated relays L as there are subscribers plus one for dedicated line 33. The latter relay coils are driven by a separate set of integrated circuits (not shown) under control of the micro-controller 84. A solenoid latch 115 of an entry door 114 is also coupled to the programmable input/output circuit 82. An alarm either local or remote 116 is connectable to the programmable input/output circuit 82.

A ringing generator circuit 68 connects to one contact of relay C at an output thereof and has its input coupled to the programmable input/output circuit 82. The ringing generator 68 is used to generate a ringing signal to the subscriber telephone set 16. A ring trip circuit 110 coupled to the other contact of relay C is used to detect when the subscribers telephone set 16 goes "off hook" (or has been answered). Electrically eraseable programmable read only memory array (EEPROM) 96 is arranged to be removably connectable to the micro-controller 84 by means of a plug-in connection. All of the system parameters are stored in the EEPROM array 96 which can be programmed by means of either test module 130 coupled through a two way driver 100 to the micro-controller 84 or remotely on a dedicated central office line such as line 33 of FIG. 2. By arranging to have the EEPROM array 96 attached by means of a plug-in cartridge, the array can be programmed at the factory with a standard set of parameters thereby minimizing set-up time at the building. The two-way driver 100 provides a communication or special features port 132 to which additional controllers such as a video control or an elevator controller may be added.

In operation if a visitor presses a key on a keypad 23 of panel 20, a keypad signal on one of the control lines 138 goes low indicating to the micro-controller 84 that a key has been pressed. The micro-controller 84 which has been continually scanning the keypad lines from each panel, enables an audio line to the panel 20 or 21 which has been accessed. An audio tone generated in, say panel 20, passes through the 2 to 4 hybrid circuit 64 to the DTMF transceiver 102 where the signal is analyzed. If valid, a number is stored corresponding to the frequency from the associated keypad key. If no further keys are pressed the system times out and returns to an idle state. If additional keys are pressed then each corresponding tone is interpreted by the DTMF transceiver 102. The second tone generated is interpreted as an apartment number and the corresponding line relay 24 is activated. The loop current is then monitored by the loop detect circuit 66 to determine if the subscriber or resident is "on hook" (idle) or "off-hook" (busy). If the resident is busy or "off-hook", then a loop detect signal is generated from the current through resistors 78 and 80 and directed to the programmable input/output chip 82. Relay B is activated and the DTMF transceiver 102 then generates an intrusion tone which passes through the 2 to 4 wire hybrid circuit 64 to the subscriber telephone 16 causing two successive short "beeps". Relay E and capacitors C1 and C2 allow alternating current speech signals to continue to be transmitted between the central office exchange and the subscriber after relay B is activated.

The subscriber may then dial "3" to activate the E relay and cut off the transmission of speech between the central office exchange and the subscriber. Relays B and D are both activated connecting the subscriber to the panel 20 and allowing him to communicate with the visitor. If the subscriber then dials "6" the corresponding tone goes through the 2 to 4 wire hybrid circuit 64 to the DTMF transceiver 102 and is detected by the micro-controller 84. The micro-controller 84 then activates the door latch 115 of door solenoid 114 for a fixed time duration through the programmable input/output circuit 82. After the fixed time has elapsed, the voice path is switched back to the central office exchange caller. If the resident inadvertently hangs up the telephone, as evidenced by a loss of loop current, the micro-controller 84 remembers that there is a central office caller, activates relay C and the ringing generator 68 to ring the resident. As soon as the resident or subscriber answers the telephone 16, a DC path through the phone is completed and the ring trip circuit 110, which detects DC voltage applied to line 75 by the ringing generator 68, goes high. The micro-controller 84 deactivates the line relay L and directly connects the central office lines 32 and 34 to the subscriber lines 70 and 72, respectively. The circuitry is then in an idle mode.

If at the time a visitor is at the panel 20 there is no central office caller, then when the visitor dials the subscriber, the micro-controller 84 activates the line relay L as well as relay C and causes the ringing generator 68 to apply a ringing signal to the subscriber lines 70 and 72. When the telephone is answered by the resident, the ring trip detector output 110 will go from low to high causing relay C to be deactivated and relay B to be activated connecting the voice path between the panel 20 and the subscriber telephone set 16. The micro-controller 84 monitors the ring detect circuit 60 which goes high as soon as the central office caller is present. The micro-controller 84 then sends intrusion tones to the resident who is talking to the visitor through relay B which has been activated. The subscriber can then dial "3" to deactivate the relay and answer the incoming call while ignoring the visitor. Alternatively, the subscriber can dial "6" to activate the door latch 115 of door 114. The subscriber then hears the tone corresponding to door latch activation and the resident line is switched automatically to the central office caller. As a third option, the subscriber can simply hang up to deactivate relay B following which the central office call rings the subscriber directly.

If a visitor presses the appropriate number sequence at the panel keypad 23 of panel 20 or 21, corresponding to an automatic dialing mode, the micro-controller 84 activates the line relay corresponding to the reserved control office line 33. In a 48 line system this may typically be the 48th line. The D relay is activated to connect the visitor to the central office exchange. The A relay is also activated and a dial tone originating from the central office exchange is detected through the 2 to 4 wire hybrid circuit 62 coupled to relay A by the micro-controller 84. The micro-controller 84 by means of the DTMF transceiver 102 then sends out tones corresponding to a pre-programmed telephone number. The programmed telephone number corresponds to the key sequence code pressed at the panel. Connection between the central office and the panel 20 or 21 is allowed only for a preset time.

Security Entry

Entry of selected personnel can be achieved by utilizing a security entry code. In this case a four digit code preceded by a pound key (#) can be punched in at the panel keypad. The micro-controller 84 distinguishes between a visitor call and code sequence by the pound key. If the code corresponds to one of a preset number of codes stored in the EEPROM memory array 96 then the micro-controller 84 activates the door latch 115 of door 114.

Programming

Remote programming of the system to reset security codes, auto dialing numbers and time out times can be achieved through the central office exchange by simply dialing the number corresponding to the reserved central office line 33 which is also used for the automatic dialing (auto-dial) feature. Such an incoming call is detected by the ring detect circuit 60 through relay A. Relay A is then activated coupling the 2 to 4 wire hybrid circuit 62 to the central office lines 32 and 34. Transformer T2 presents the same D.C. path to the central office line as would an "off-hook" telephone. The micro-controller 84 through the DTMF transceiver 102 sends out "beeps" to the caller through the 2 to 4 wire hybrid circuit 62 to request a remote programming security code. This code must be entered correctly within a preset time period, usually 10 seconds, or programming will be prohibited. Once the remote programming security code is entered correctly, two "beeps" are sent indicating that the system is ready for programming. Each code is entered successively by pressing the required number of keys followed by a pound key. After each parameter is changed two "beeps" are emitted. Parameters which can be set are apartment security codes, a guard security, a postman code, a building code, a security level code and an auto-dial telephone number. To terminate programming, an asterisk and a pound key are successfully entered without intervening data.

A special features port 132 to which can be connected a variety of additional features including a test module 130 is provided by a bi-directional driver circuit 100 coupled to the micro-controller 84. The test module 130 is used for a variety of purposes such as panel simulation, system parameter programming, security code programming, resetting auto-dial numbers and running a diagnostic program to check system operations.

A local or central alarm 116 can be input to the programmable input/output circuit 82. The micro-controller 84 in response to an alarm signal causes the door latch 115 of door 114 to be pulsed continuously so as to allow exit and entry at will.

Various additional features can be added to the system via the special features port 132 such as a video controller to determine which apartment a video signal from a panel camera 50 is directed. The camera 50 itself is activated by a signal from the micro-controller 84 via the programmable input/output circuit 82.

An elevator controller 44 may also be added to the special features port 132 to limit a visitor from going to any floor except that of a corresponding subscriber that he has accessed. In this case, a signal from the central processing unit controls the floor to which the elevator can travel.

SECURITY CODE ENTRY

The present system is capable of being set to operate in three different security levels. The first level simply involves the intercom function in which a caller is allowed entry by a subscriber with no provision for entry of service personnel or apartment dwellers except by other means such as a key. The second security level corresponds to a code for service personnel in addition to subscriber controlled entry of visitors. The third level provides for entry of apartment dwellers in response to entry of an apartment security code in addition to the first and second security level features.

Figure 5:
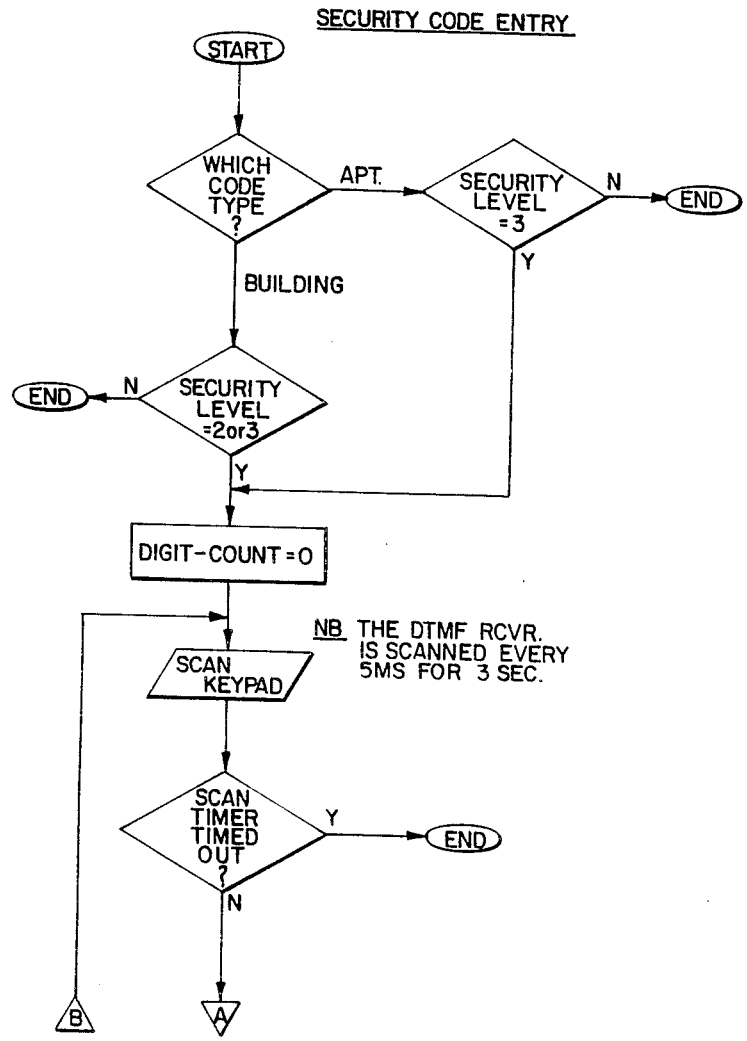
FIGS. 5-7 are flow diagrams showing the manner in which the security code entry routine is executed by the system.
Figure 6:
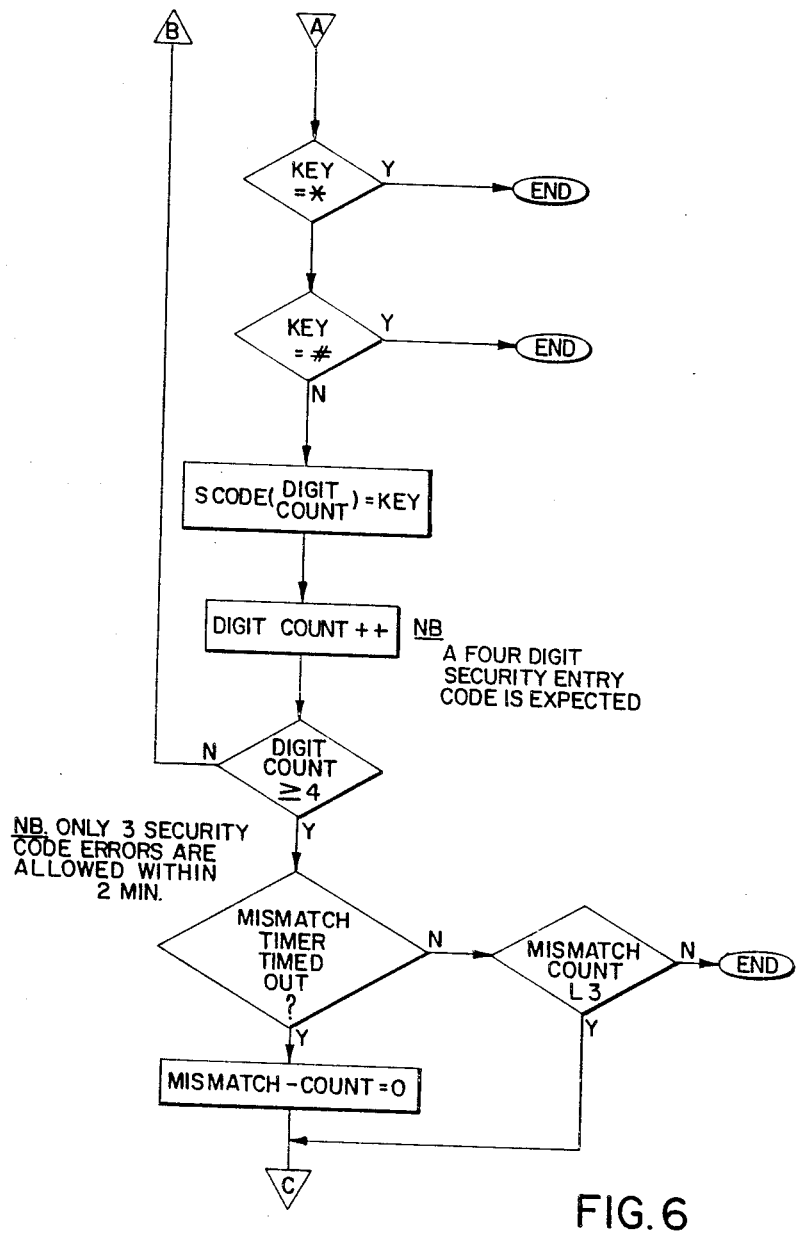
Figure 7:
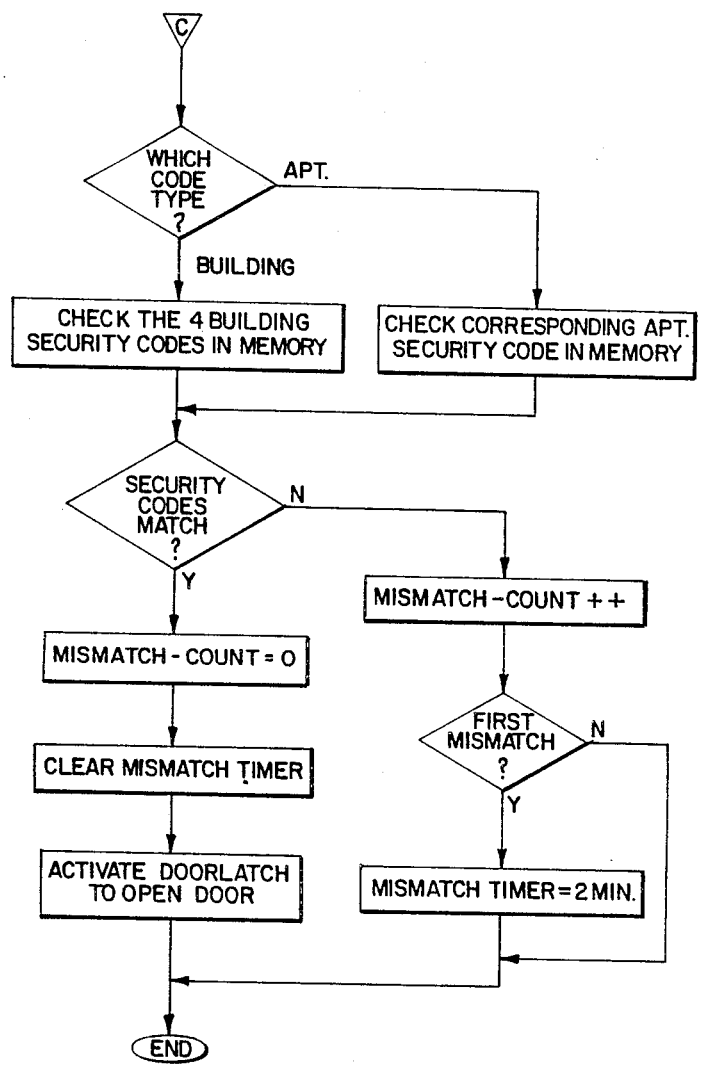

On entry of a security code a DTMF generator in the panel (not shown) transmits tones corresponding to the data entered along voice lines 140, through contacts D, the 2 to 4 wire hybrid circuit 64 and analog gates 106 and 108 to the DTMF transceiver 102. Initially, the data entered is examined by the CPU 84 to determine if an apartment or a building code has been entered and an appropriate bit is set in memory to define which is being entered. An apartment code will have numbers preceding a pound key whereas a building code will not. The routine executed for the security code entry routine shown in FIGS. 5 to 7 determines initially whether the code entered is an apartment code or a building code. If an apartment code the security level value is checked. If the security level as preset by the manager or other authorized person, is 1 or 2 then the routine is ended. If not, then the memory locations corresponding to "digit-count" are initialized (set to zero). Similarly, if a building code has been entered then provided the system level is at least 2, digit-count is set to zero.

Next the DTMF transceiver 102 is scanned by the CPU 84 through the programmable Input/Output 82 every 5 millisconds for 3 seconds. Since the scanner will not initially be timed out, checks are done to determine if the data entered is an asterisk or a pound key. If not then the first value entered after a pound key is stored in a buffer location SCODE(0). The value of digit-count is incremented to be 1 and the keypad is once again scanned at the DTMF transceiver 102 as explained above. The second key depressed after the pound key is stored in buffer location SCODE(1) and digit-count again incremented. This loop is repeated until either digit-count reaches 4 or the scanner times out on any given key entry. Once a four digit number has been stored in buffer, the code entered is checked.

Initially, the mismatch timer will be zero or timed out. Thus, zero is stored in the mismatched count and then the code, whether apartment or building is checked with the corresponding code in memory. If the codes match the location mismatch-count is initialized, the mismatch timer is cleared and the door latch opened. If the codes do not match, then the value of mismatch is incremented and, if this is the first mismatch, the mismatch timer is set to 2 minutes. After 3 consecutve mismatches within 2 minutes, the system will ignore any further security code entries until the mismatch timer times out.

REMOTE PROGRAMMING

Figure 8:
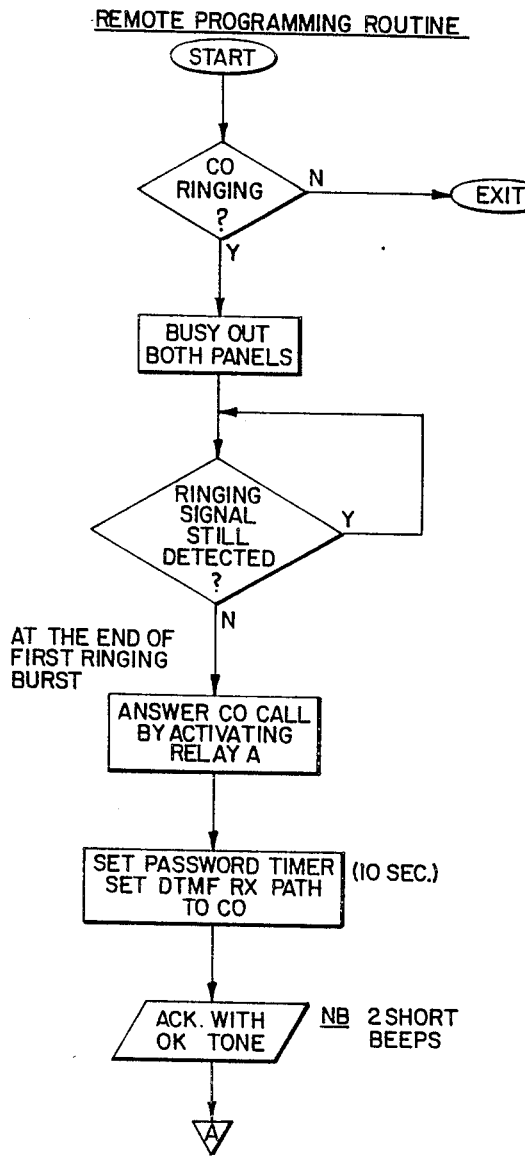
FIGS. 8-13 are flow diagrams showing the manner in which the remote programming routine is executed by the parties.
Figure 9:
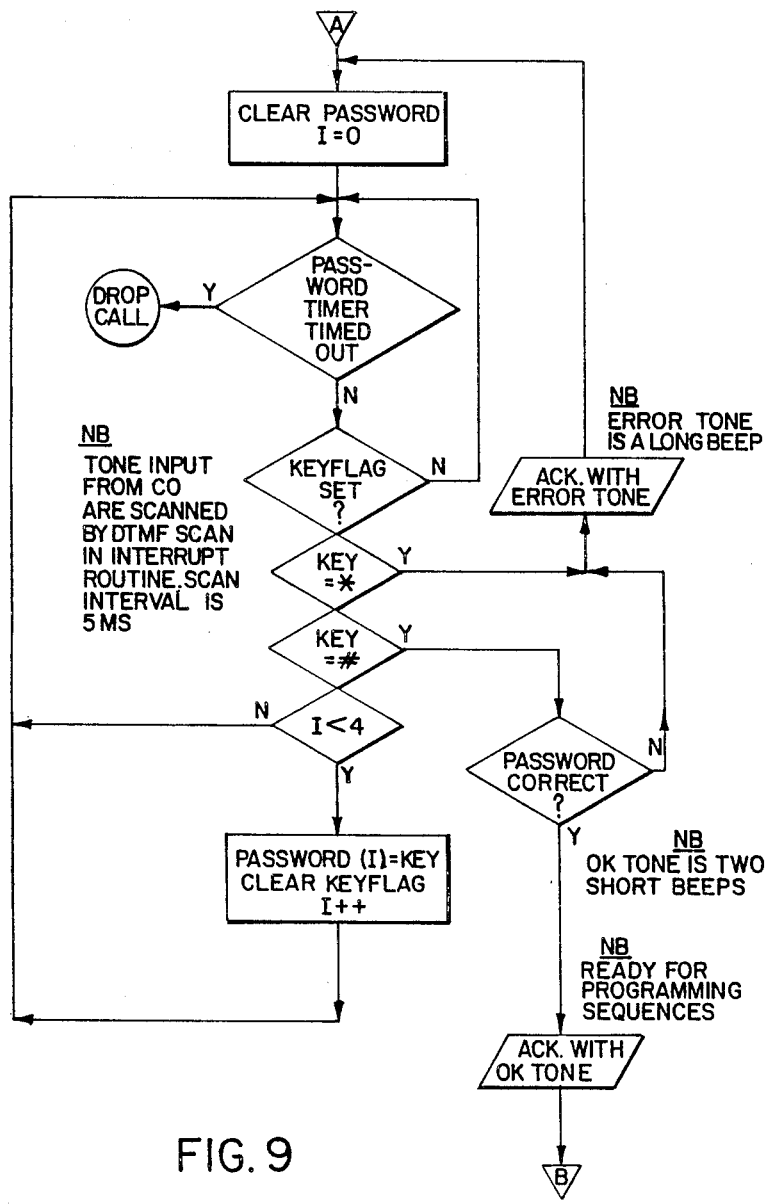

Referring to FIG. 8 ringing on lines 75 and 77 of FIG. 4 is monitored by the CPU 84 through ring detect circuit 60 and the programmable input/output 82. If a ringing signal is detected, both panels are placed in a "busy" condition so panel entries are not possible. Once the first ringing burst is over, relay A is activated to answer the central office (CO) call. A pass word timer is set to 10 seconds and analog gate 108 set so that it passes signals from 2 to 4 wire hybrid 62 rather than from 2 to 4 wire hybrid 64 to the DTMF. Two short tones are transmitted to the central office lines 32, 34 to indicate to the caller an acknowledgement of correct entry. One single long tone will indicate an error. As shown in FIG. 9 the password buffer is cleared and the counter, I, is set to zero. While the password timer is not timed out; the system monitors key entries from the central office lines 32, 34. If an asterisk key is entered, the system will acknowledge with an error tone, cancel the entry, and restart the loop with the password buffer cleared and the counter, I, equals zero. Any digit 0 to 9 input will be stored in the password buffer and the counter, I, increments. Four digits are expected as the password input. A pound key will enter the password, and the system will branch off to check for valid password. If it is valid an acknowledgement of two short "beeps" is sounded to indicate a ready condition for programming. If not, then a long beep is sounded and the system returns to A. The call will be dropped if a valid password is received within 10 seconds.

Figure 10:
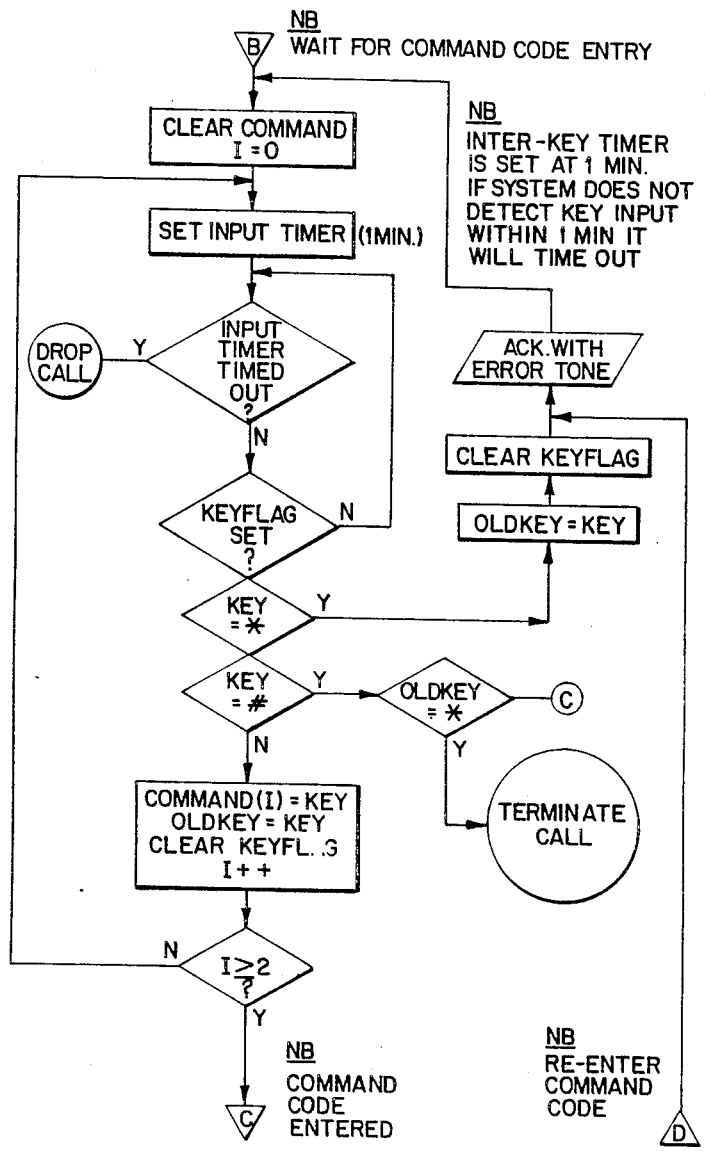
Figure 11:
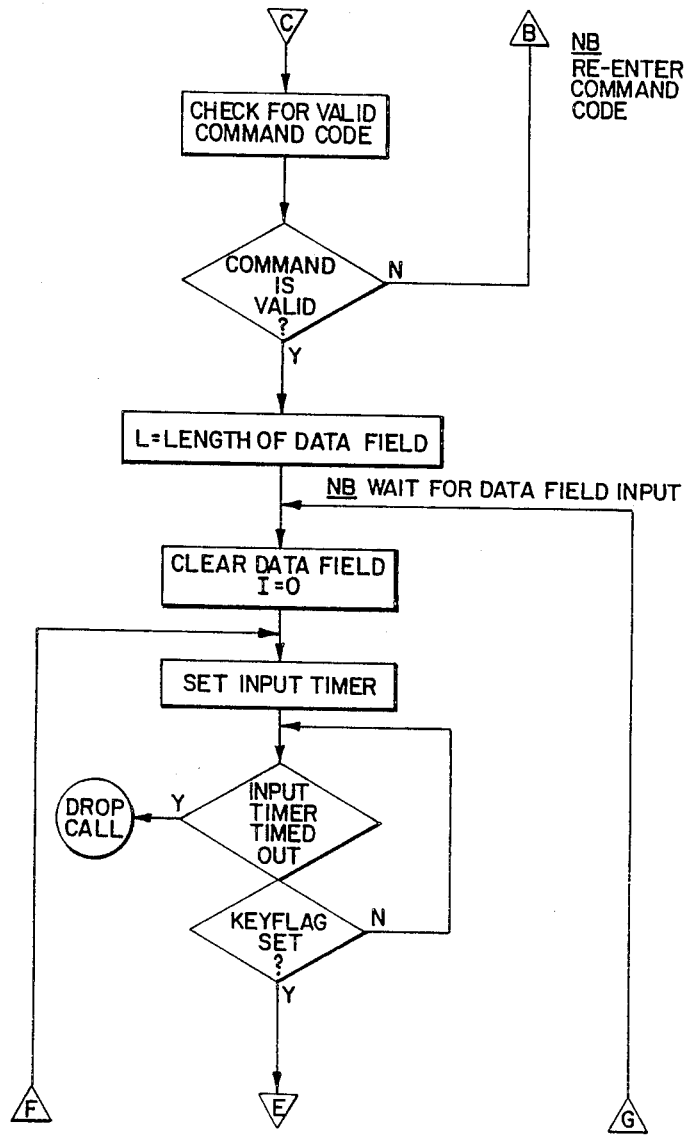
Figure 12:
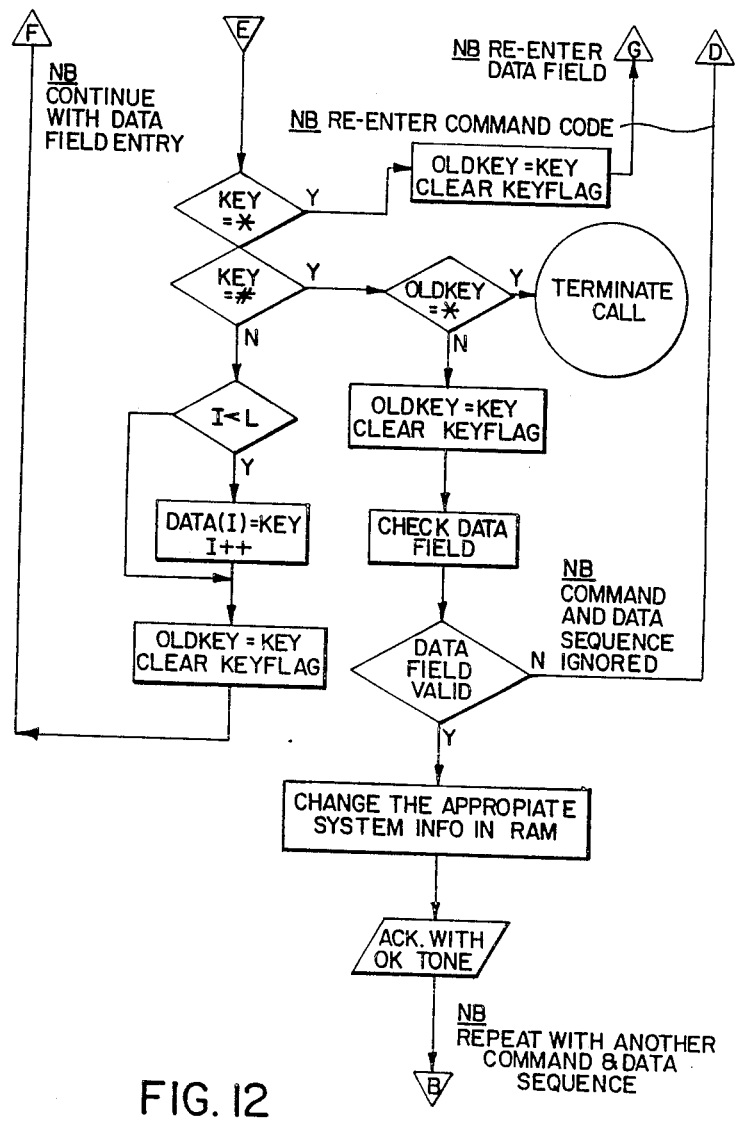

Assuming a correct password has been entered as shown in FIG. 10 the system clears I, sets and input timer to 1 minute, checks to see if the input timer is timed-out, whether a digit (0, 1, 2, . . . 9) or an asterisk or a pound key has been depressed. The program now looks for a command code of two digits which tells the system what information is to be programmed. If the system does not detect a key entry within 1 minute the call will be dropped. Upon each key entry, the key is processed, and stored in "old key", then the key flag is cleared so that the system can start scanning for the next key input. If an asterisk is detected, key entry will be cancelled and a single error tone is generated and transmitted along the central office lines. On each pass the key value is stored in the buffer COMMAND (I) and OLD KEY, the key flag is cleared and the value of I incremented. Once two digits have been processed the system goes to stage C. When a pound key is depressed if an asterisk has previously been depressed then the call is terminated, otherwise, the routine goes to stage C and checks whether or not the two digit code entered is a valid command code as shown in FIG. 11. If not valid, the system returns to stage B for re-entry of the command code. If valid command code is entered, the system then waits for data field input. The data field is cleared, the input timer set at 1 minute, and a check is made to determine whether the timer is timed-out, the asterisk is depressed as seen in FIG. 12, the pound key depressed or a digit key is depressed. If a digit key is depressed, then the key value is stored in buffer location "data (I)". I is incremented, the key value stored in OLD KEY, the "key flag" bit is cleared and then the system returns to set the input timer and repeat the sequence to continue with data field entry. Detection of asterisk cancels the sequence and causes the system to return for re-entry of data. An asterisk followed by a pound key causes the call to be terminated while a pound key alone enters the data field sequence. After which the data stored is checked and if valid is sent to RAM memory to replace the existing information. Acknowledgement is indicated with a "tone" and then the system returns to step B to repeat entry of command and data for another parameter. Depressing the asterisk followed by the pound key terminates the sequence.

Figure 13:
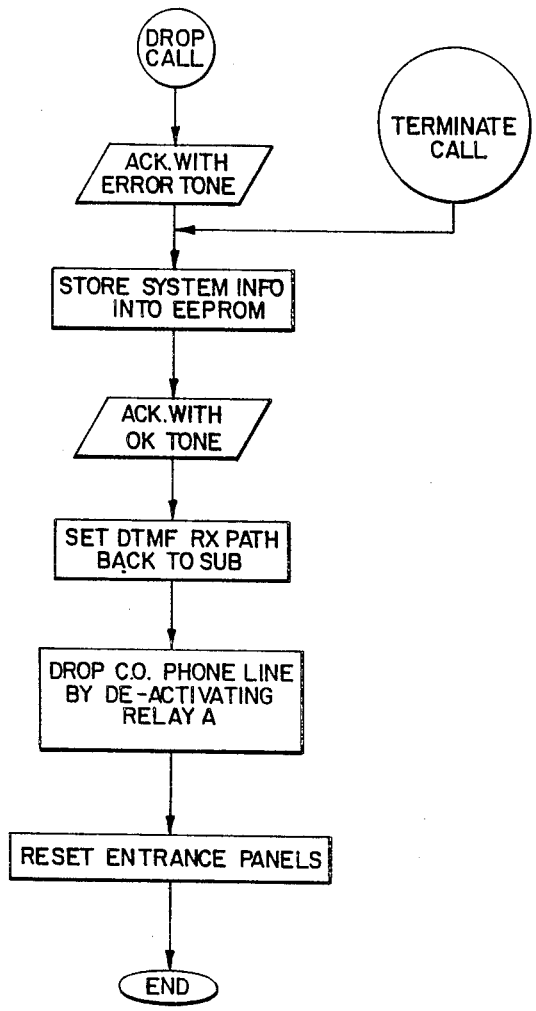

As shown in FIG. 13 if a call has been dropped an error tone acknowledges this result and system information is then stored in EEPROM memory. If a call is terminated only the latter step is carried out. An acknowledgement is then sounded, the DTMF path is set by deactivating relay B and the central office line dropped by deactivating relay A. The entrance panels are reset and the remote programming sequence ended.

AUTOMATIC DIALING

The automatic dialer feature provides a visitor with limited access to the telephone network for emergencies or service related matters. For example, the system can be programmed with phone numbers for the apartment manager, the security office, the rental office, maintenance and janitorial services, emergency services, etc.

Figure 14:
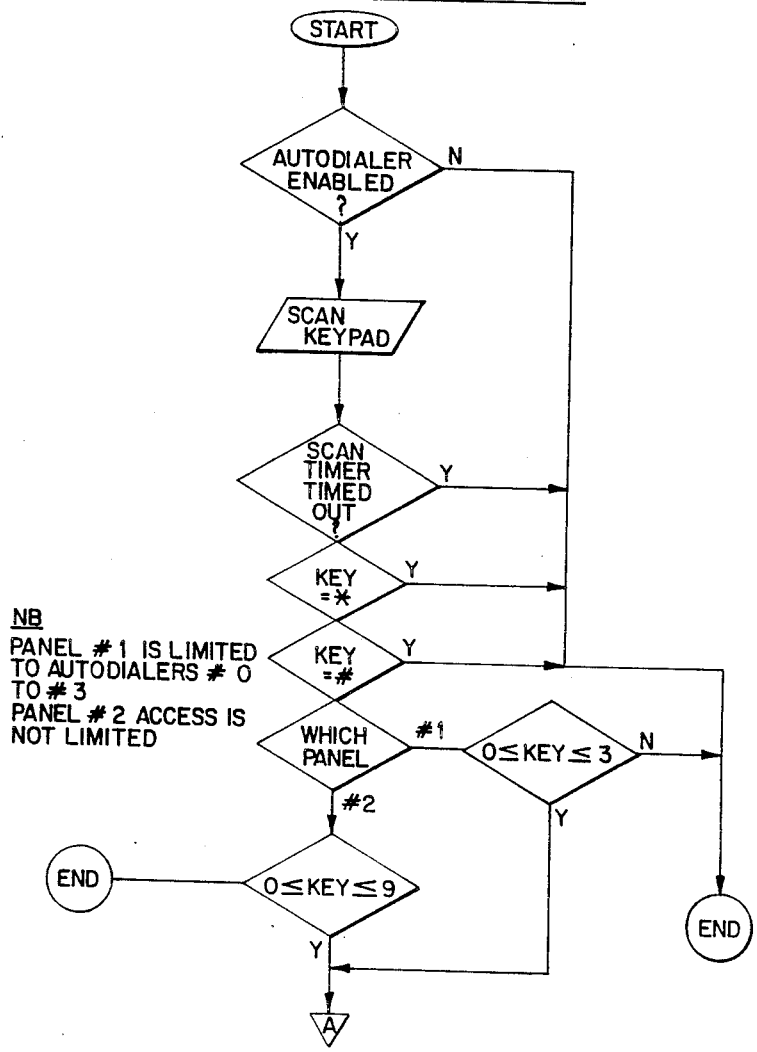
FIGS. 14-17 are flow diagrams showing the manner in which the autodial dialing out function is executed by the system.

For use as seen in FIG. 14, the visitor must key in two consecutive pound keys "##" and then an index number which selects the particular phone number to dial out. Once the automatic dialer has been enabled, the keypad is scanned and following time out, asterisk and pound key checked, the panel where the information has been received is determined and the key value checked to determine if it is in the range of 0 to 3 or 0 to 9 for panels 1 and 2, respectively. In this case, panel 1 access is limited.

Figure 15:
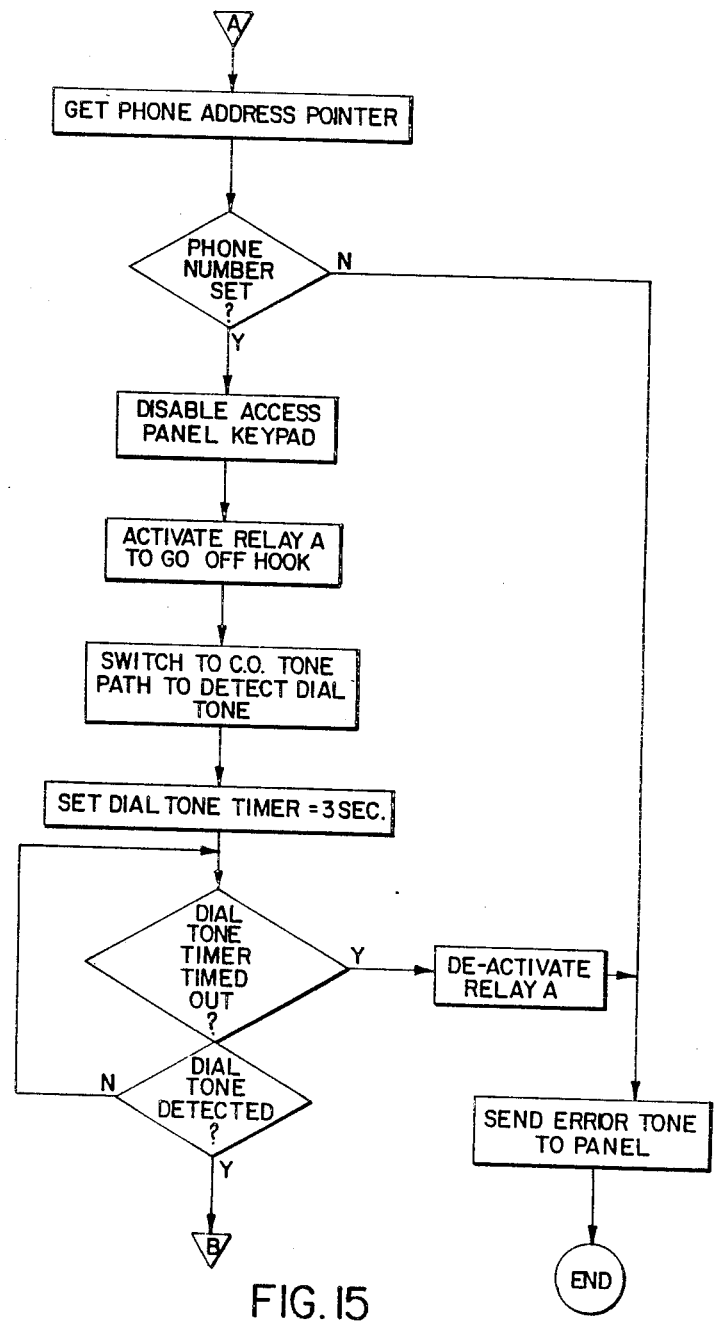

As shown in FIG. 15A phone address pointer is enabled and the phone number tested to see if it is set. If so, the access panel is disabled and relay B activated to go "off hook". Relay A is activated coupling the 2 to 4 wire hybrid 62 to the DTMF transceiver 102 to allow detection of a dial tone on the control office path 32, 34. A dial tone timer is set to 3 seconds and a loop entered to check for reception of a dial tone. Either the timer times out or a dial tone is detected. If timed out, relay A is inactivated and an error tone sent to the panel.

Figure 16:
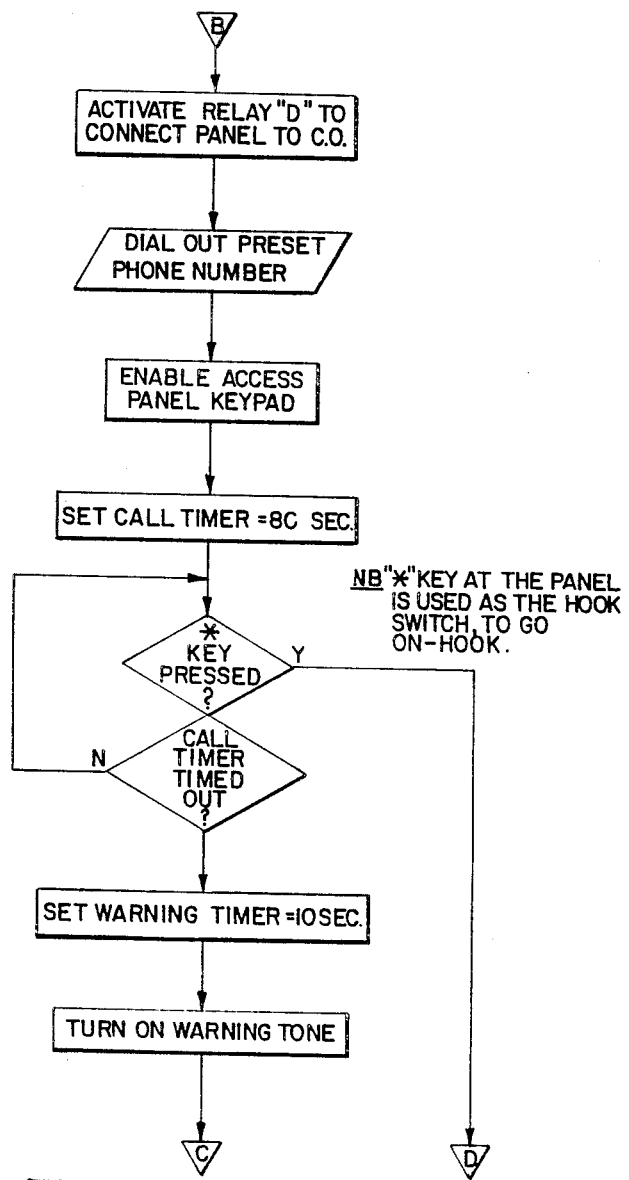
Figure 17:
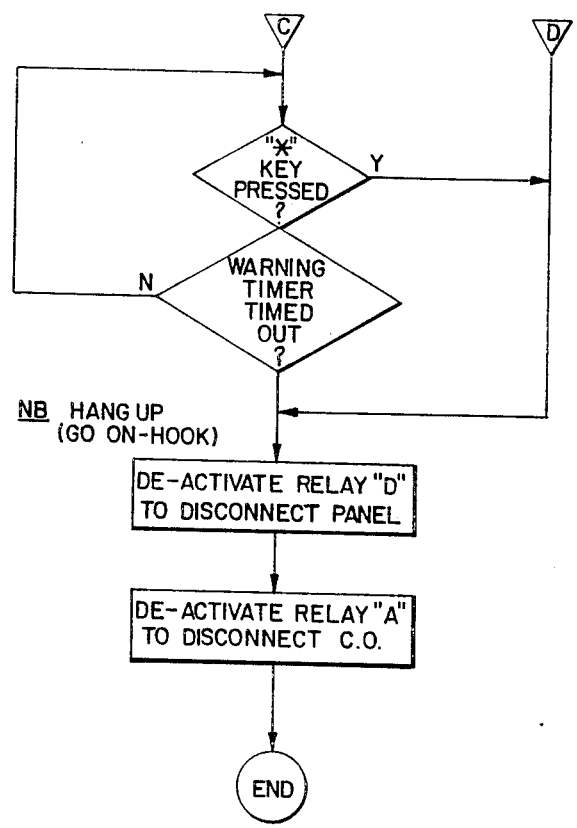

As seen in FIG. 16 after detection of a dial tone relay D is activated to connect the access panel to the central office lines 32,34. The preset number is then dialed out by the tone generator 104 under control of the CPU 54. The access key panel is once again enabled and the call timer set for 80 seconds. If the caller wishes to terminate the call before the 80 seconds time out period this as seen in FIG. 17 is done by pressing the asterisk key. Once a call is timed out a 10 second warning is set and a warning tone turned on. On time out of the warning relay D is de-activated disconnecting the panel and then relay A is de-activated to disconnect the central office lines.

While the invention has been particularly shown and described with reference to a preferred embodiment thereof, it will be understood by those skilled in the art that the foregoing and other changes in form and detail may be made therein without departing from the spirit and scope of the invention as claimed.

We claim:

1. A building security system for coupling to a building telephone line which includes a building subscriber telephone line connected to a subscriber telephone set at one end and a central office line at the other end, the central office line leading to a central office exchange, and a visitor entrance panel proximate a building entrance door, comprising:
   a microprocessor means for controlling operation of said system, for receiving and transmitting data and control signals to and from said central office exchange, said entrance panel and said subscriber telephone set and thereby controlling communication between a central office caller, a subscriber and a visitor via said building telephone line;
   programmable memory means for storing preselected security codes and an operating program for operation of said microprocessor means;
   a building door lock means coupled to said entrance door;
   means for selectively coupling said microprocessor means directly to a reserved central office line leading from said building to the central office exchange, wherein said coupling means responds to control signals from the entrance panel or to signals received via said reserved line; and
   wherein said microprocessor means includes means for distinguishing between a visitor call and a security entry code sequence and for comparing a security entry code sequence being entered with stored security entry codes in said memory means and for unlocking the entrance door on recording a correspondence between an entered security code sequence and a stored security code and wherein said microprocessor means further includes means responsive to control signals received from a subscriber telephone set to send a control signal to said building entrance door lock means to cause the unlocking of said door.

2. A system according to claim 1, including means for detecting and evaluating an authorized remote programming request received on the reserved central office line and for re-programming one or more selected stored security entry codes and other stored data or parameters, in response to control signals received on the reserved central office line.

3. A system according to claim 1, including a DTMF transceiver coupled to and controlled by said microprocessor means, wherein said microprocessor means includes means for programming said memory means with a plurality of telephone numbers and, in response to entry of a selected auto-dial code from the entrance panel retrieves a corresponding one of said stored telephone numbers and causes said DTMF transceiver to transmit to the central office on said rearward central office telephone line tones corresponding to the retrieved telephone number.

4. A building security system for coupling to a plurality of pairs of building telephone lines coupled to respective subscriber telephone sets for controlling communication between a central office exchange caller, a subscriber and a visitor at a building entrance panel, and for controlling visitor entry through an entrance door, comprising:

- a microprocessor means for controlling operation of said system, for receiving and transmitting data and control signals to and from said central office exchange, said entrance panel and said subscriber telephone sets for controlling communication between a central office caller, a subscriber and a visitor;
- non-volatile memory means coupled to said microprocessor means programmable for storing system parameters including security entry codes and reprogrammable to change the parameters;
- a latch solenoid driving circuit having an input coupled to said microprocessor means and an output connectable to a door latch solenoid of an entrance door and operative in response to a control signal from said microprocessor means to activate said solenoid and unlock said door;
- a plurality of line relays each coupled to respective pairs of telephone lines and to said microprocessor means for breaking direct connection of a pair of central office lines and a corresponding pair of subscriber telephone lines and inserting in series with the latter pair of lines, a respective pair of lines of said security system in response to a control signal from said microprocessor means;
- means for selectively coupling said microprocessor means directly to a reserved pair of central office lines leading from the building to the central office exchange, wherein said coupling means selectively responds to signals from said reserved central office line and control signals form said entrance panel;
- means for comparing a transmitted remote programming security code received on said reserved pair of central office lines with a stored one and, if matched, to accept reprogramming instructions received on said reserved pair of central office lines to re-program one or more stored security entry codes, emergency telephone numbers or other parameters;
- means for transmitting tones on said reserved pair of central office lines corresponding to a selected stored emergency telephone number in response to auto-dial control signals received from the entrance panel;
- wherein said microprocessor means includes means for distinguishing between a visitor call and a security entry code sequence being entered with stored security entry codes in said memory means and for unlocking the entrance door on recording a correspondence between an entered security code sequence and a stored security code.

5. A building security system according to claim 4, including a multi-frequency transceiver coupled to said microprocessor wherein said non-volatile memory means is programmable to store a plurality of telephone numbers and in response to entry of a selected auto-dial code, said microprocessor retrieves from said non-volatile memory means a corresponding telephone number and sends control signals to said multi-frequency transceiver which, in turn, generates and transmits tones corresponding to said stored telephone number to said central office exchange through said reserved pair of central office lines.

6. A building security system according to claim 4, including a special features port, and a two way driver coupling said special features port to said microprocessor such that said microprocessor may transmit and receive data through said two way driver to a controller device coupled to said port.

7. A building security system according to claim 4, wherein said non-volatile memory means includes an array of electrically erasable, programmable read only memory cells mounted in a plug-in cartridge.

8. A building security system according to claim 5, including a telephone key pad at said entrance panel coupled to said system.

9. A building security system according to claim 4, including:
- ringing detect circuit means coupled to said reserved central office line pair for detecting an incoming call on said reserved line pair;
- relay switching control circuit means coupled to said microprocessor and to said ring detect circuit means and responsive to a control signal from said ring detect circuit means to switch on to said reserved pair of central office lines a load substantially equal to that of an off-hook telephone set; and
- wherein a DTMF transceiver transmits tones to said reserved central office line pair to indicate program ready status in response to control signals from said microprocessor and said non-volatile memory means receives and stores programming data transmitted from a central office caller to said microprocessor and then to said memory means.

10. A building security system according to claim 4, including read only memory means and random access memory means coupled to said microprocessor for storing program instructions and working data, respectively.

11. A building security system according to claim 4, including a programmable input/output circuit interfaced between said microprocessor and input and output control signal lines.

12. A building security system according to claim 6, wherein said micro-controller has means responsive to test control signals applied to said special features port to run system diagnostics and check system operation.

* * * * *

UNITED STATES PATENT AND TRADEMARK OFFICE
CERTIFICATE OF CORRECTION

PATENT NO. : 4,957,855

DATED : June 26, 1990

INVENTOR(S) : Wayne McNab and Jim Siu

It is certified that error appears in the above-identified patent and that said Letters Patent is hereby corrected as shown below:

In claim 3, column 12, line 68, "rearward" should be --reserved--
In addition, in claim 4, column 13, line 40,
"form" should be --from--.

Signed and Sealed this

First Day of October, 1991

Attest:

Attesting Officer

HARRY F. MANBECK, JR.

Commissioner of Patents and Trademarks